(12) United States Patent
Chao

(10) Patent No.: US 6,400,357 B1
(45) Date of Patent: Jun. 4, 2002

(54) METHOD FOR ASSEMBLING THE RUBBER DOME INTO THE KEYBOARD AND THE KEYBOARD THEREOF

(75) Inventor: Shih-Hung Chao, Taoyuan (TW)

(73) Assignee: Acer Communications & Multimedia, Inc. (TW)

(*) Notice: Subject to any disclaimer, the term of this patent is extended or adjusted under 35 U.S.C. 154(b) by 0 days.

(21) Appl. No.: 09/192,976

(22) Filed: Nov. 16, 1998

(30) Foreign Application Priority Data

Aug. 5, 1998 (TW) ........................................ 87112918 A

(51) Int. Cl.[7] .................................................. G09G 5/00
(52) U.S. Cl. ........................................ 345/168; 400/472
(58) Field of Search ........................ 345/168; 200/344; 400/472; 341/34

(56) References Cited

U.S. PATENT DOCUMENTS

| | | | | |
|---|---|---|---|---|
| 5,278,557 A | * | 1/1994 | Stokes et al. | 341/34 |
| 5,667,319 A | * | 9/1997 | Satoff | 400/472 |
| 5,799,772 A | * | 9/1998 | Sanda et al. | 200/344 |
| 5,813,778 A | * | 9/1998 | Shih | 400/496 |
| 6,054,939 A | * | 4/2000 | Wei et al. | 341/20 |
| 6,191,776 B1 | * | 2/2001 | Hu | 345/168 |

FOREIGN PATENT DOCUMENTS

EP       0315910     * 5/1989     ............. G06F/1/00

OTHER PUBLICATIONS

"keyboard using simplified construction techniques" IBM Technical Disclosure Bulletin vol. 33, No. 7, Dec. 1990, pp 148–150.*

* cited by examiner

*Primary Examiner*—Amare Mengistu
(74) *Attorney, Agent, or Firm*—Oppenheimer Wolff & Donnelly, LLP

(57) ABSTRACT

A method for assembling the rubber domes into a housing of upper casing of a keyboard is provided. The upper casing is in substantially form of shell shape and defines a bottom surface and a top surface. The upper casing includes a multiple of housings distributed over a central portion of the bottom surface. Each housing receives one rubber dome. The method includes the steps of pouring a plurality of rubber domes over the bottom surface of the upper casing; shaking the upper casing such that one rubber dome is disposed into one corresponding housing while a number of leftover rubber domes are not received in any one of the housings; engaging a membrane circuit sheet with the central portion of the bottom surface; flipping the upper casing over such that the leftover rubber domes not covered by the membrane circuit sheet are cleaned up.

13 Claims, 4 Drawing Sheets

METHOD FOR ASSEMBLING THE RUBBER DOME INTO THE KEYBOARD AND THE KEYBOARD THEREOF

FIELD OF INVENTION

The invention relates to a method for assembling the rubber dome into the keyboard and the structure of the keyboard associating with the method.

BACKGROUND OF INVENTION

In general, the keyboard mainly includes, other than a plurality of key caps, a plurality of robber domes, an upper casing, a membrane circuit sheet and a lower casing. During the production of the upper casing, a plurality of housings are formed simultaneously. Each housing is used to receive a key cap and a rubber dome. The structure of each push button switch of keyboard includes a key cap, a rubber dome which turns on a corresponding membrane switch on the membrane circuit sheet then the key cap is depressed. As well known in the arts, the rubber dome is disposed into the housing from the side of the bottom surface of the upper casing. On the other hand, the key cap is disposed into the housing from the side of the top surface. The top surface of the keyboard is the surface facing the user. The bottom surface of the keyboard is the surface opposite to the top surface and faces the lower casing of the keyboard. The function of each component of the push button switch is well known in the arts.

Typically, there are two approaches implementing the rubber domes within the keyboard. One type is in form of an integral sheet with a multiple of rubber domes formed thereon and another type is in form of a single rubber dome isolated from other rubber domes within other housings. Integral sheet type rubber domes are formed by producing a plurality of (around 125) of rubber domes at the same time integrally. Each rubber dome is connected to each other by an integral rubber sheet during production. The advantage of the integral sheet type is its capability of disposing each of all rubber domes into their corresponding housings by single operation. However, when considering the operation purpose of the rubber dome itself, more than half of the rubber material of the integral sheet type rubber domes is for connection purpose and wasted. To save the material cost of the rubber within the keyboard, a single rubber dome configuration mentioned above is adopted.

In contrast, in the single rubber dome configuration, a plurality of the rubber domes are made simultaneously without connecting one rubber dome with other rubber domes. Therefore, no rubber material is wasted. However, as stated below, the assembly process of the rubber domes into the housings for the single rubber dome configuration involves more tedious procedures than the integral sheet type rubber domes.

To assembly the rubber domes for the single rubber dome configuration within their housings, the straight forward way is to insert one rubber dome into one housing of the upper casing one by one by the human effort. This approach obviously involves intensive human labors and is cost ineffective and time consuming.

Another way is first pouring a multiple of rubber domes over the bottom surface of upper casing. Afterwards, a human or a mechanical vibration action is input to dispose each rubber dome over the bottom surface of upper casing into one corresponding housing. At the end of the procedure, a number of rubber domes are leftover and no received in any one of the housings. If some housings do not have one rubber dome therein, the operator then feeds the rubber dome by hand into the empty housings. The leftover rubber domes located at positions other than housings are also picked up and removed by operator. The procedure spent on the removal of the leftover rubber domes is timing consuming and cost ineffective.

SUMMARY OF INVENTION

To the mentioned disadvantages, the present invention provides a method and a keyboard thereof which quickly removes the leftover rubber domes and therefore improves the assembly efficiency of the rubber domes.

The upper casing of the keyboard of the invention defines a bottom surface and a top surface and includes a multiple of housings distributed over a central portion of the bottom surface. Each housing receives one rubber dome. The method includes the steps of pouring a plurality of rubber domes over the bottom surface of the upper casing; shaking the upper casing in order to dispose one rubber dome into one corresponding housing while a number of rubber domes are leftover and not received in any one of the housings; engaging a membrane circuit sheet with the central portion of the bottom surface; flipping the upper casing over such that the leftover rubber domes not covered by the membrane circuit sheet are cleaned up.

The advantages and the details of the invention may be further understood by the following recitations and appended drawings.

BRIEF DESCRIPTIONS OF DRAWINGS

DETAILED DESCRIPTIONS OF THE EMBODIMENT

Figure 1:
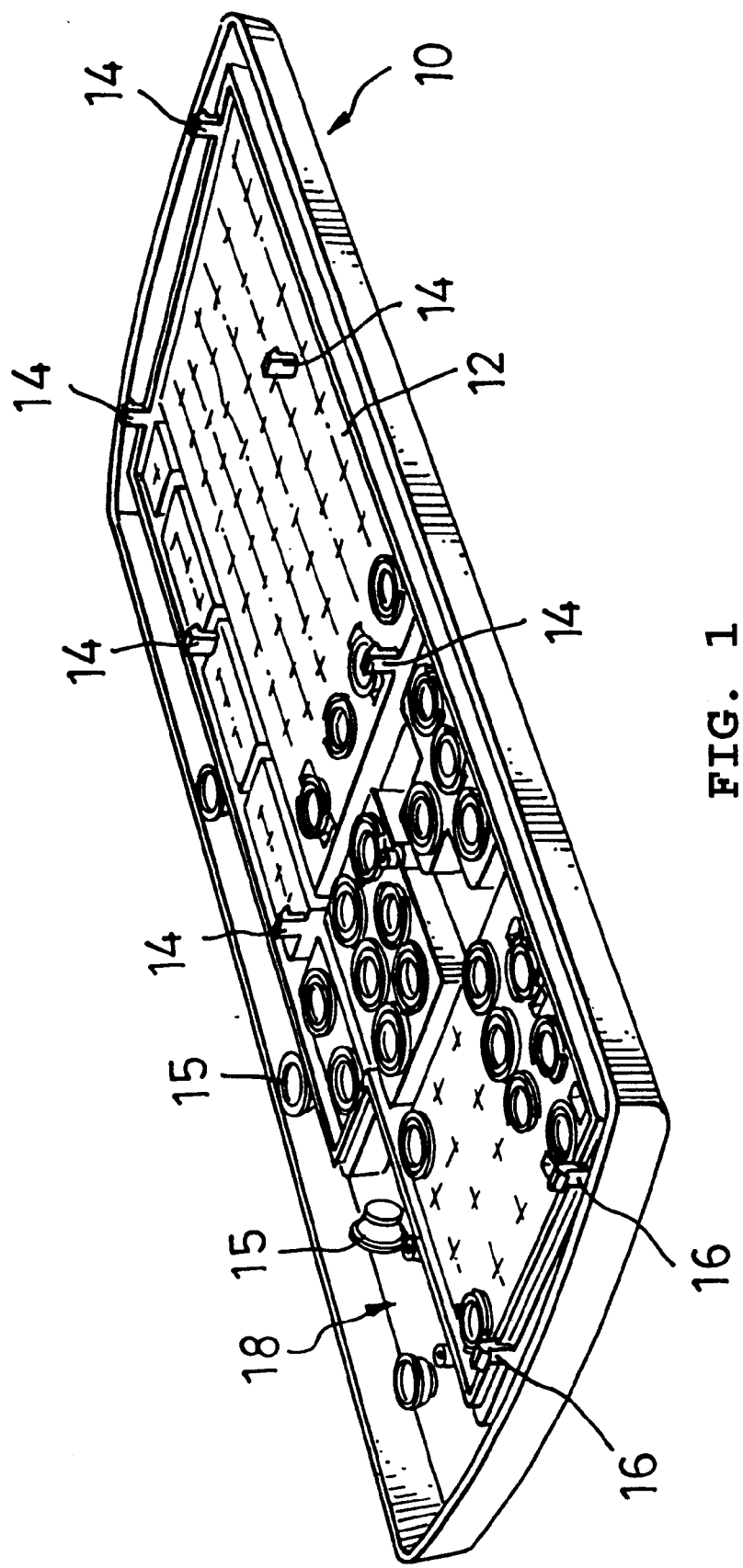
FIG. 1 shows a perspective view of the upper casing of keyboard, in accordance with the invention, taken from the side of the bottom surface of the keyboard.

As shown in FIG. 1, the keyboard upper casing 10, in accordance with the invention, is substantially in form of a shell shape and includes a plurality of housings distributed over a central portion 12 of the bottom surface. Each housing is used to receive a rubber dome and a key cap. The rubber dome is disposed into the housing from the side of the bottom surface of the upper casing. On the other hand, the key cap is disposed into the housing from the side of the top surface of the upper casing. Furthermore, as shown, a surrounding channel is formed between the sides of the upper casing 10 and the central portion 12 over which a plurality of housings are distributed.

Different from the prior arts, the central portion 12 of the bottom surface of the upper casing 10, in accordance with the invention, includes a multiple of hook apparatuses. The hook apparatuses are classified as the first set of hook devices 14 and the second set of hook devices 16. Each hook device 14 has a hook end orienting to the right and each hook device 16 has a hook end orienting to the left. Alternatively, the hook device 14 has a hook end orienting to the left and the hook device 16 has a hook end orienting to the right.

The upper casing 10 is first disposed on the operation bench with the bottom surface facing upward to undergo the operation of pouring a plurality of rubber domes over the bottom surface of upper casing 10. Afterwards, a human or a mechanical vibration action is input in order to dispose one rubber dome into one corresponding housing. Alternatively, a wiping device, e.g. a swivel brush, is used to dispose most of the rubber domes into their corresponding housings. At the end of the procedure, a number of rubber domes 15 are leftover and not received in any one of the housings. If some housings do not have one rubber dome therein, the operator then feeds the rubber dome by hand into the empty housing. The leftover rubber domes 15 located at positions other than housings, as shown in FIG. 1, has to be removed.

Figure 2:
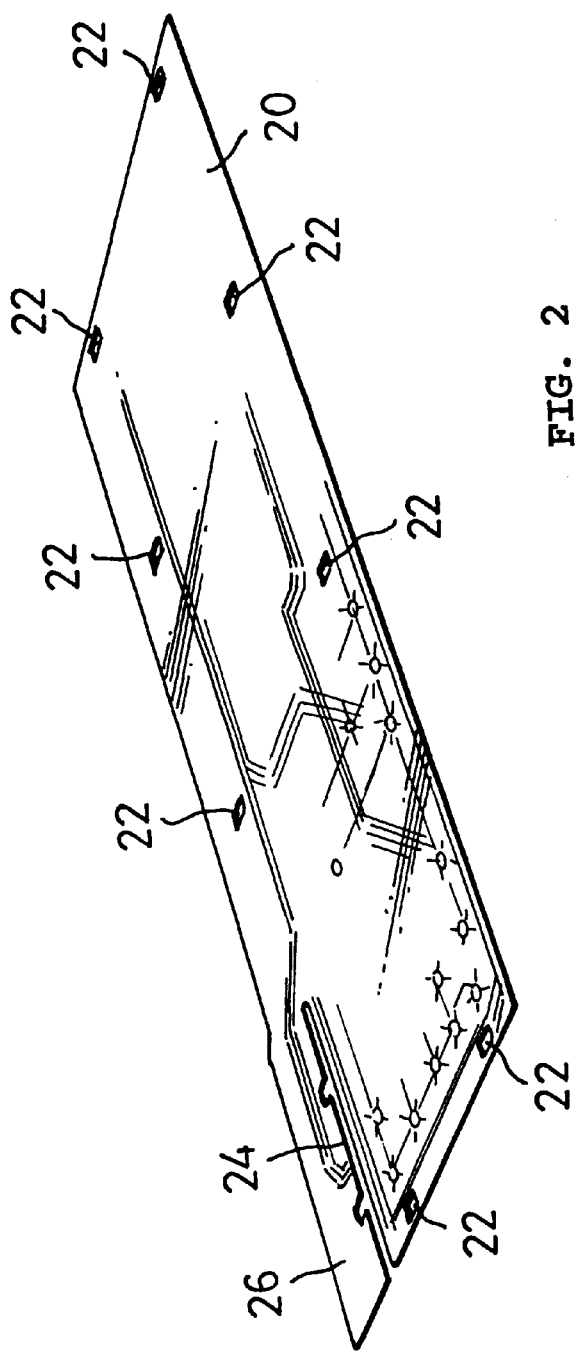
FIG. 2 shows the membrane circuit sheet in corporation with the upper casing in FIG. 1.

As show in FIG. 2, the contour of the membrane circuit sheet 20 provided by the invention substantially follows the contour of the central portion 12 of the bottom surface of the upper casing 10. As well known in the arts, there are a multiple of switches over the membrane circuit sheet 20. Each switch is turn ON as one corresponding rubber dome is depressed due to the action of the corresponding key. To facilitate the connection between the membrane circuit sheet 20 and the central portion 12 of the upper casing 10, the membrane circuit sheet 20 includes a plurality of slots 22 each of which corresponds one hook 14 or 16.

Figure 3:
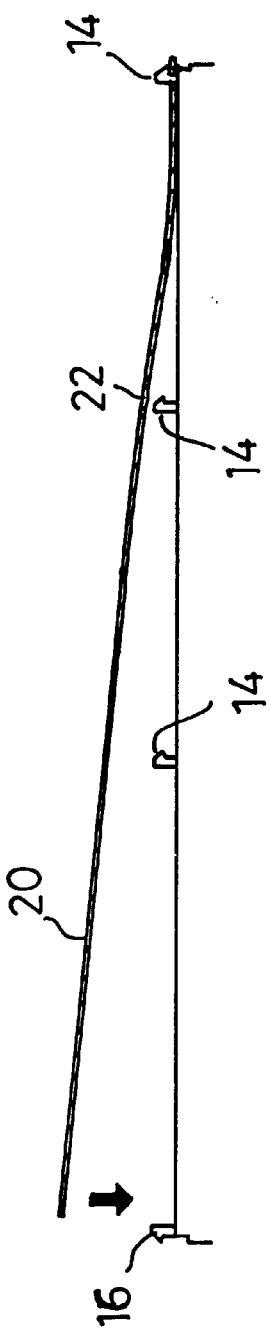
FIG. 3 shows how the membrane circuit sheet engages with the upper casing.

As shown in FIG. 3, during assembly, after the first set of hook devices 14 pass the corresponding slots 22 to complete the connection, the membrane circuit sheet 20 is forced to displace leftward by a small amount and this action allows the slots 22 at the left hand side pass the hook devices 16 and effect the connection of the slots 22 at the left hand side to the hook devices 16.

Figure 4:
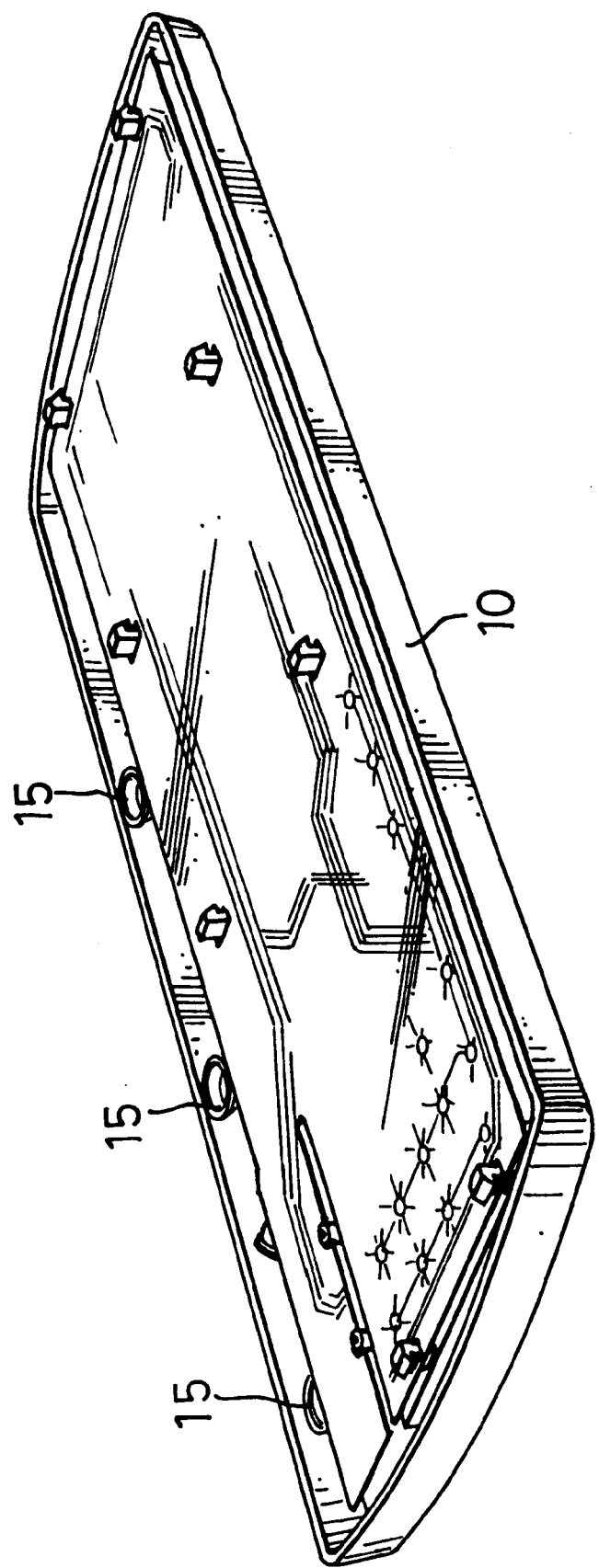
FIG. 4 shows the perspective view of upper casing of keyboard as the membrane circuit sheet is assembled.

The status of the upper casing 10 and membrane circuit sheet 20, after the above procedure is completed, is shown in FIG. 4. At this time, the rubber dome within each housing is covered and retained by the membrane circuit sheet 20. However, the leftover domes 15 within the surrounding channel of the upper casing 10 are not retained by the membrane circuit sheet 20.

In succession, through a human or a machine operation, the upper casing 10 shown in FIG. 4 is flipped over such that the bottom surface of the upper casing 10 facing downward and the top surface of the upper casing 10 facing upward. This single operation cleans up all rubber domes 15 not retained by the membrane circuit sheet 20 shown in FIG. 4. And because of the existence of the membrane circuit sheet 20 retaining all rubber domes within the housing, the rubber domes within the housing would not drop out during the clean up action. Notwithstanding, an alternative approach is to employ a vacuum type cleaner apparatus which can easily suck up the light-weight rubber dome 15 within the surrounding channel of the upper casing 10 not retained by the membrane circuit sheet 20.

Since the membrane circuit sheet 20 is a requisite of the keyboard device, by providing a novel structures on the upper casing 10 and the membrane circuit sheet 20, the invention resolves the drawbacks of the conventional approaches. No new device or element is needed.

The purpose of the cut line 24 provided within the membrane circuit sheet 20, shown in FIG. 2, is to allow the membrane portion 26 adjacent to the cut line 24 to be uncoverable. The provision of the cut line 24 and the uncoverable membrane portion 26 are directed to the concave space 18 at the upper left corner of the upper casing 10 in FIG. 1. In general, the concave space 18 is provided to accommodate the printed circuit board implementing the control circuit of the keyboard. The finger array (not shown) of the print circuit board is connected to the printed finger array (not shown) distributed along the cut line 24 of uncoverable membrane portion 26. With the provision of the cut line 24, during the connection of printed circuit board to the uncoverable membrane portion 26, the force applied to the uncoverable membrane portion 26 would not be propagate to other portion of the membrane circuit sheet 20. This is the first reason for providing the cut line 24.

Furthermore, due to the existence of the concave space 18, there might be some leftover rubber domes 15 within this concave space 18 other than leftover rubber domes 15 within the surrounding channel of the upper casing 10. During the flip over operation of the upper casing 10 mentioned above, due to the uncoverability of the membrane portion 26, the leftover rubber domes 15 within this concave space 18 and under the uncoverable membrane portion 26 can drop from the cut line 24 and can be cleaned up easily.

Figure 5:
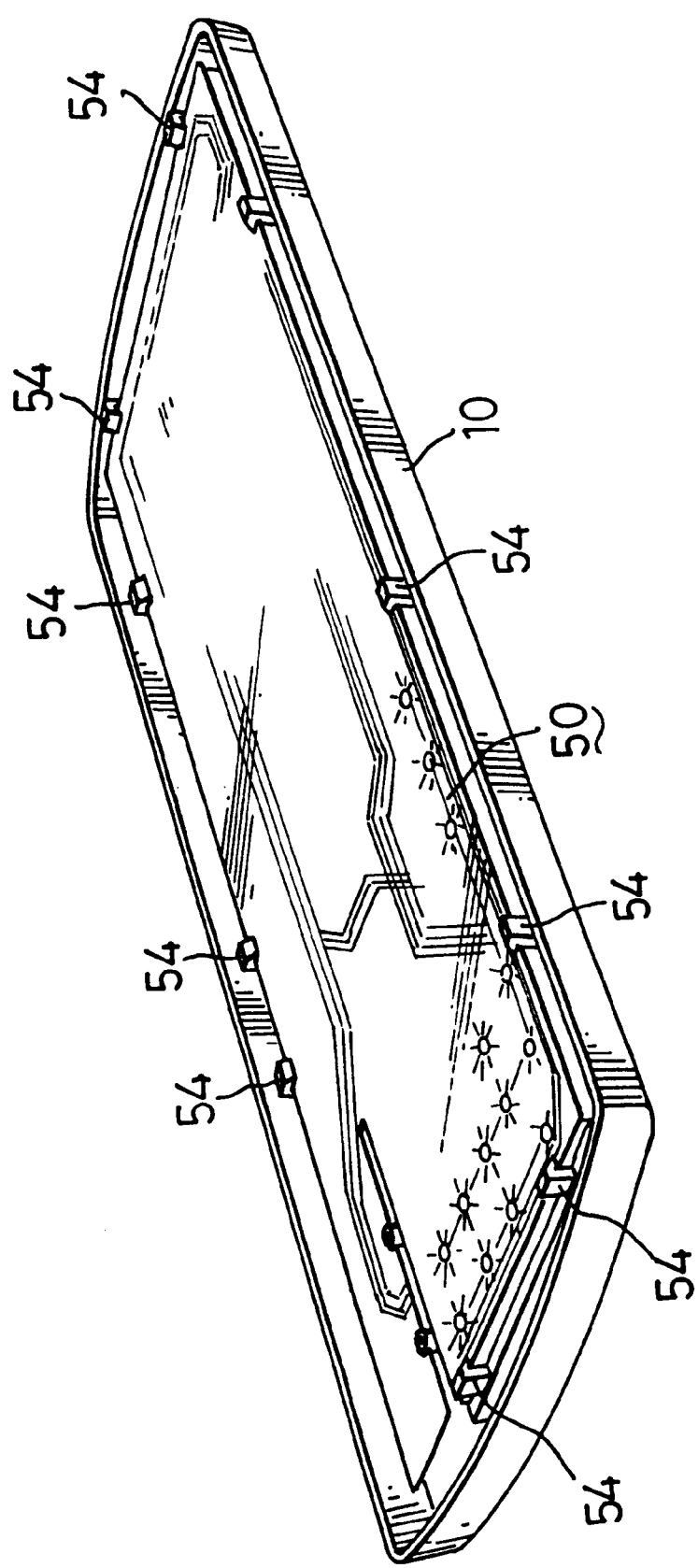
FIG. 5 shows the second embodiment of the invention.

Under the basic concept of the invention, the second embodiment of the invention is shown in FIG. 5. The upper casing 10 is characterized in that the edge of the central portion of bottom surface of the upper casing 10 provides a multiple of hook devices 54 for engaging a membrane circuit sheet 50. The hook end of each hook device 54 is orienting to the central portion of bottom surface. Before disposing the membrane circuit sheet 50, one needs to deform the membrane circuit sheet 50 slightly such that the edges of membrane circuit sheet 50 can be inserted into the space defined by the hook end of hook 54. After the force is released, the membrane circuit sheet 50 resumes its original shape, the multiple of hook devices 54 then engage the edges of membrane circuit sheet 50. This embodiment also achieves the object of the invention.

What is claimed is:

1. A method for disposing a rubber dome into a housing of an upper casing of a keyboard, the upper casing defining a bottom surface and a top surface, the upper casing comprising a plurality of housings distributed over a central portion of the bottom surface, each housing being used to house one rubber dome, comprising the following steps:

(1) pouring plurality of rubber domes over the bottom surface of the upper casing;

(2) disposing one rubber dome into one corresponding housing while a number of leftover rubber domes are not received in any one of the housings;

(3) engaging a membrane circuit sheet with the central portion of the bottom surface of the upper casing;

(4) cleaning the number of the leftover rubber domes not within the housing and not covered by the membrane circuit sheet.

2. The method of claim 1, wherein the central portion of the bottom surface of the upper casing provides a hook means for engaging with the membrane circuit sheet.

3. The method of claim 2, wherein the hook means comprises a first set of hook device and a second set of hook device, the first set of hook device has a hook end orienting to the right, the second set of hook device has a hook end orienting to the left.

4. The method of claim 3, wherein the membrane circuit sheet comprises a slot for engaging with one corresponding hook device.

5. The method of claim 1, wherein an edge of the central portion of the upper casing provides a plurality of hook devices, each hook device has a hook end orienting toward the central portion such that the plurality of hook devices together engage with the edge of the membrane circuit sheet.

6. The method of claim 1, wherein the membrane circuit sheet comprises a cut line such that a membrane portion adjacent to the cut line is uncoverable.

7. An upper casing of a keyboard, the upper casing defining a bottom surface and a top surface, the upper casing comprising a plurality of housings distributed over a central portion of the bottom surface, each housing receiving a rubber dome, the upper casing being characterized in that the central portion of the bottom surface of the upper casing comprising a multiple of hook means for engaging with a membrane circuit sheet.

8. The upper casing of claim 7, wherein the membrane circuit sheet provides a plurality of slots, each slot engaging with one corresponding hook.

9. The upper casing of claim 7, wherein the hook means comprises a first set of hook device and a second set of hook device, the first set of hook device has a hook end orienting to the right, the second set of hook device has a hook end orienting to the left.

10. The upper casing of claim 7, wherein the membrane circuit sheet comprises a cut line such that a membrane portion adjacent to the cut line is uncoverable.

11. An upper casing of a keyboard, the upper casing defining a bottom surface and a top surface, the upper casing comprising a plurality of housings distributed over a central portion of the bottom surface, each housing receiving a rubber dome, the upper casing being characterized in that a multiple of hook means are provided at an edge of the central portion of the bottom surface of the upper casing and integral with the upper casing for engaging with a membrane circuit sheet when the bottom surface faces down to keep the rubber dome in the housing.

12. The upper casing of claim 11, wherein hook means comprising hook end orienting toward the central portion of the bottom surface.

13. The upper casing of claim 11, wherein the membrane circuit sheet comprises a cut line such that a membrane portion adjacent to the cut line is uncoverable.

* * * * *